United States Patent [19]

Korall et al.

[11] Patent Number: 5,418,080
[45] Date of Patent: May 23, 1995

[54] MECHANICALLY RECHARGEABLE, ELECTROCHEMICAL METAL-AIR BATTERY

[75] Inventors: Menachem J. Korall; Yehuda Harats; Jonathan Sassen; Jonathan R. Goldstein, all of Jerusalem, Israel

[73] Assignee: Electric Fuel (E.F.L.) Ltd., Jerusalem, Israel

[21] Appl. No.: 269,846

[22] Filed: Jul. 1, 1994

[51] Int. Cl.[6] .................................... H01M 12/06
[52] U.S. Cl. ........................... 429/27; 429/34; 429/72; 429/49
[58] Field of Search ............... 429/27, 49, 17, 19, 429/34, 38, 39, 72, 131, 136, 144, 249

[56] References Cited

U.S. PATENT DOCUMENTS

| | | | |
|---|---|---|---|
| 3,682,706 | 8/1972 | Yardney et al. | 429/27 |
| 4,246,324 | 1/1981 | de Nora et al. | 429/17 |
| 4,389,466 | 6/1983 | Joy | 429/27 |
| 4,950,561 | 8/1990 | Niksa et al. | 429/27 |
| 5,318,861 | 6/1994 | Harats et al. | 429/21 |

*Primary Examiner*—Anthony Skapars
*Attorney, Agent, or Firm*—Helfgott & Karas

[57] ABSTRACT

A mechanically rechargeable, electrochemical metal-air battery of the type having a plurality of metal-air cells, each of said cells comprising (a) a housing having a base, two major surfaces and two minor surfaces, defining an interior space for containing therein a replaceable metal electrode having an electrically conductive skeletal member encompassed by an active metal component, the interior space communicating with an opening opposite the base through which the replaceable metal electrode is selectively removed to enable the mechanical replacement thereof with a freshly charged metal electrode; (b) at least one generally planar, air permeable but liquid impermeable, air electrode, each of the electrodes being installed in a window-like opening provided in at least one of the major surfaces; and (c) an electrolyte in contact with the metal and air electrodes; the improvement comprising a first woven mesh separator attached to an inner, electrolyte-facing surface of each of the air electrodes and a second, woven mesh separator attached to and covering a major surface of the replaceable metal electrode facing each of the air electrodes, the first and second woven mesh separators being in sliding relationship to each other.

12 Claims, 3 Drawing Sheets

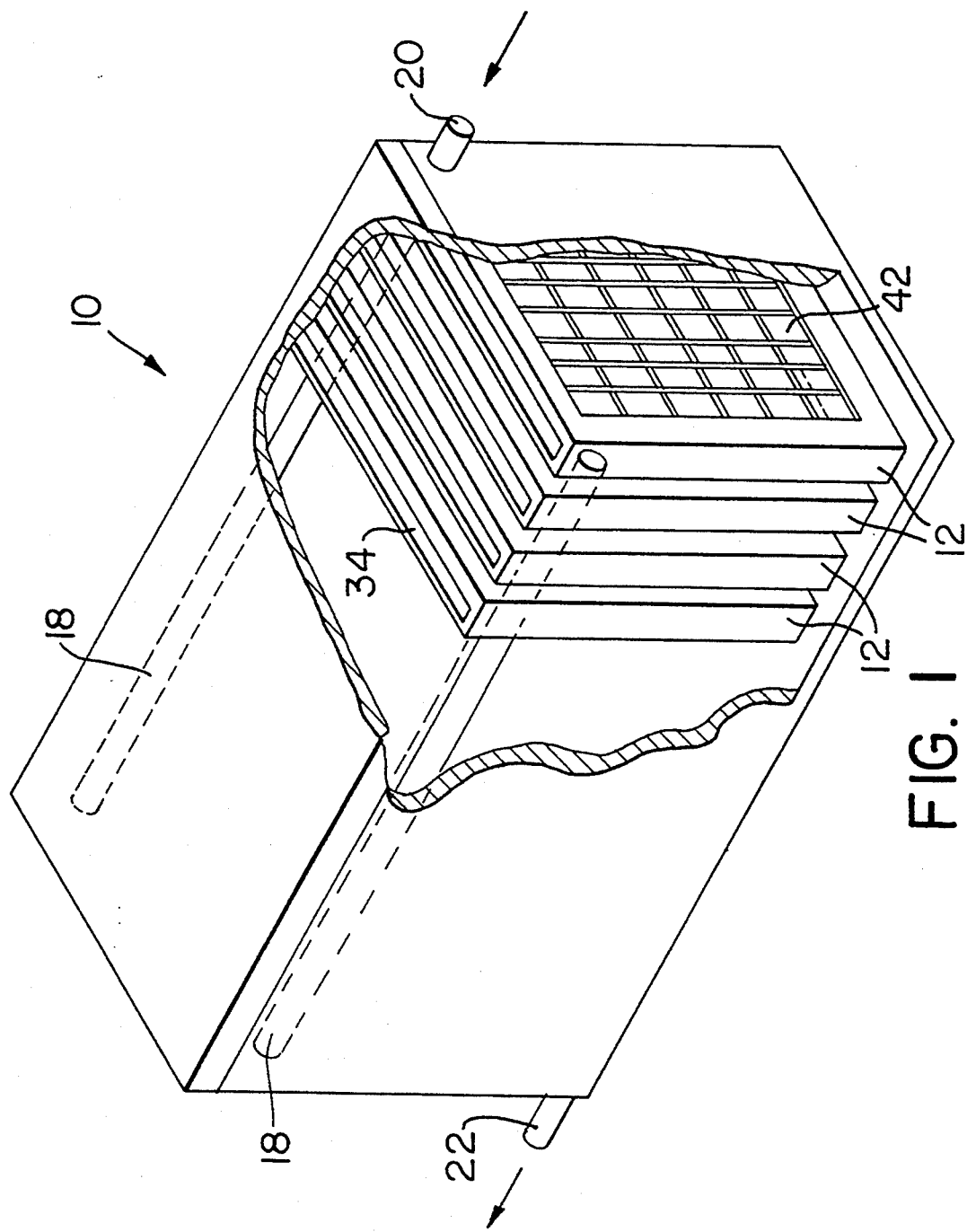

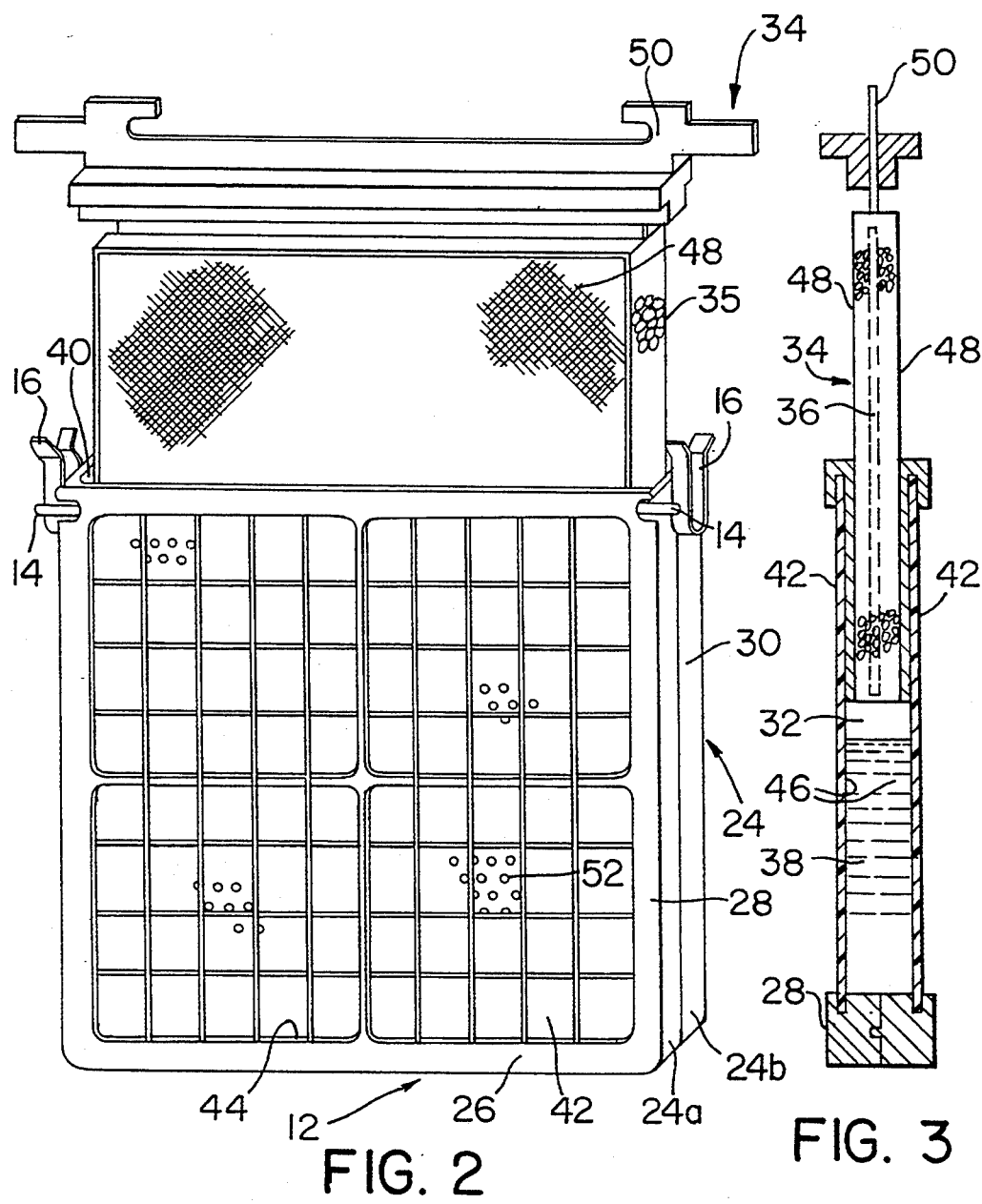

MECHANICALLY RECHARGEABLE, ELECTROCHEMICAL METAL-AIR BATTERY

The present invention relates to an electrochemical metal-air cell and to replaceable, rechargeable anodes for use therein. More particularly, the present invention relates to such cells for use in metal-air batteries specifically designed for automotive application.

Due to their high energy-to-weight ratio, safety of use, and other advantages, metal-air, and particularly zinc-air, batteries have been proposed as a preferred energy source for use in electrically-powered vehicles.

To date, much of the development concerning use of metal-air batteries as a main power source for vehicle propulsion has focused on modified "mechanically rechargeable" primary battery systems, comprising a consumable metal anode and a non-consumable air cathode, the metal anode being configured to be replaceable once the metal component therein is expended following oxidation in the current-producing reaction. These systems obviously constituted an advance over the previously-proposed secondary battery systems, which have to be electrically charged for an extended period of time once exhausted, and require an external source of direct current.

Some of these mechanically rechargeable systems, such as the one disclosed in U.S. Pat. No. 4,139,679 Appelby, are quite complex in construction, incorporating an active particulate metal anode component freely suspended in an alkaline electrolyte, and a pump to keep the particulate metal anode in suspension and circulated between air cathodes. After discharge of the metal anode component, the electrolyte is then replaced with an electrolyte containing a fresh particulate metal anode component in suspension.

Other prior art battery systems, such as the one disclosed in U.S. Pat. No. 3,416,966 to Oswin, comprise electrochemical cells utilizing a fixed planar anode configured for easy replacement and placed closely adjacent to one or more air cathodes, physically separated therefrom by fluid-permeable protective screens, but kept in current-producing contact with the cathode by an alkaline electrolyte. Referring to FIG. 1 of said patent, a metal anode element, denoted 10, generally comprises a central corrosion-resistant current collector planar metallic mesh or foil frame 12, attached to a base member 14 and a terminal 16. An anode 18, consisting of a laminated sheet metal or porous metal plate, or a viscous slurry of active metallic particles, typically zinc impregnated with electrolyte, is spread over frame 12. Once the metal anode element 10 is entirely discharged, it is removed from the cell and replaced by a fresh anode element.

Mechanically rechargeable, electro-chemical metal-air batteries with mechanically replaceable anodes have been further developed by Applicant's company, as reflected, e.g., in U.S. Pat. No. 5,196,275; U.S. application Ser. No. 07/964,644, filed Oct. 21, 1992, now U.S. Pat. No. 5,360,680; and U.S. application Ser. No. 08/002,656, filed Jan. 11, 1993, now U.S. Pat. No. 5,318,861, the teachings of which are incorporated herein by reference.

These systems have been particularly heralded for use in electric vehicle propulsion, since they facilitate quick recharging of the vehicle batteries simply by replacement of the spent anodes, while keeping the air cathodes and other battery structures in place. This mechanical recharging, or refueling, may be accomplished, for instance, in service stations dedicated to that purpose. To further enhance the cost-efficiency of such systems, it has been proposed in our above-mentioned co-pending applications to regenerate the metal anode at an external plant by a chemical recycling process, so that it may be reformed into a fresh anode element for later reuse in either the same, or a different, cell.

In this context, it is necessary to provide metal-air battery cells that will repeatedly allow insertion and removal of the zinc anode elements for each charge/discharge cycle without causing wear and tear to the mechanically-sensitive air electrode flanking each zinc anode.

Accordingly, the present invention provides, in a mechanically rechargeable, electrochemical metal-air battery of the type having a plurality of metal-air cells, each of said cells comprising (a) a housing having a base, two major surfaces and two minor surfaces, defining an interior space for containing therein a replaceable metal electrode having an electrically conductive skeletal member encompassed by an active metal component, said interior space communicating with an opening opposite said base through which said replaceable metal electrode is selectively removed to enable the mechanical replacement thereof with a freshly charged metal electrode; (b) at least one generally planar, air permeable but liquid impermeable, air electrode, each of said at least one air electrodes being installed in a window-like opening provided in at least one of said major surfaces; and (c) an electrolyte in contact with the metal and air electrodes; the improvement comprising a first woven mesh separator attached to an inner, electrolyte-facing surface of each of said at least one air electrode and a second woven mesh separator attached to and covering a major surface of said replaceable metal electrode facing each of said at least one air electrodes, said first and second woven mesh separators being in sliding relationship to each other.

Preferably, the present invention provides a mechanically rechargeable, electrochemical metal-air battery having a plurality of metal-air cells, each of said cells comprising a pair of outer air electrodes defining therebetween said interior space, wherein an inner, electrolyte-facing surface of each of said air electrodes is respectively covered with a permanently-attached, first-woven mesh separator and said replaceable metal electrode is covered on both of its major surfaces with a second woven mesh separator, said first and second woven mesh separators being in sliding relationship to each other.

In especially preferred embodiments of the present invention, a single sheet of woven mesh material is used to cover and enclose both major surfaces of said metal electrode, forming a bag therearound.

Thus, it has now been found that the type, configuration and use mode of the separator layers is of paramount importance for achieving long cell life, adequate cell performance, and minimal component wear and tear. As indicated in a preferred embodiment, there is now used a bag (usually a folded sheet sealed at the sides) of a fine nylon mesh to enclose the anode, which bag is removed with the anode.

Regarding the two air electrodes (cathodes) flanking the central zinc anode in our standard bi-cell, each inner, electrolyte-facing surface of each cathode is covered with a separator of similar material but of somewhat coarser mesh size than that of the anode bag, attached integrally by a suitable bonding process, e.g., adhesive bonding at the edges, or welding by thermal, ultrasonic or vibration means, etc., as a sheet which covers each cathode and remains permanently affixed within the cell. The repeated removal and insertion of bagged zinc anodes with the consequent smooth sliding of anode mesh over cathode mesh, has been shown to be beneficial and to have no detrimental effect on cell performance or cell and component structural properties, for over 1,000 consecutive anode replacements in cells. The proposed mode of use, sliding meshes during removal and replacement of bagged anodes, may be contrasted with that of prior art U.S. Pat. No. 3,513,030 in which only the bare anodes are removed from and restored to the cells (column 3, lines 48-51).

Similarly, the previously referred-to separator system in our U.S. Pat. No. 5,196,275 (column 9, line 38, to column 10, line 9, and FIG. 4) describes separators inserted between the air and zinc electrodes. These were primarily of the non-woven nylon type (separator 22), in combination with a fairly coarse (0.013 inches strand diameter, or 330 microns) but rather open (78% open area) protective mesh (separator 40) on one or both sides of separator 22. As an additional embodiment, ion selective separators 42 could be added between the air electrode and the non-woven separator. These separators were also envisioned as being stationary and were not designed for inter-sliding relation.

In our co-pending application, U.S. Ser. No. 08/002,656, filed Jan. 11, 1993, now U.S. Pat. No. 5,318,861, there is described a metal electrode cassette 38, which comprises a central anode element 10 enveloped by a pair of removable separators 50. However, also at the time of the drafting and filing of said application, it was not obvious to the present inventors to provide for the inter-sliding mesh arrangement first proposed in the present specification, nor were the advantages thereof realized.

Preferably, both said first and said second woven mesh separators are made of a polymeric material selected from the group consisting of a long chain synthetic polymeric amide and polypropylene.

Notably, nylon and polypropylene are low-cost materials which have shown good stability in the alkaline environment of the zinc-air cell (aqueous 30 wt. %; KOH from $-30°$ C. to $+80°$ C.).

Especially preferred for use in the present invention is a mesh size chosen to restrict migration of zinc particles that may detach from the anode and otherwise short-out to the cathode, and yet having enough open spaces to minimize ohmic losses at normal and high current drains. Also, the mesh should possess adequate mechanical strength to remain unchanged during anode replacement. We found that a fairly fine anode bag (200-400 mesh) is an asset to retain and transfer from the cell during refueling anode debris in the case of occasional shedding of pieces from a possibly sub-standard anode. The cathode woven separator sheet can be coarser (100-300 mesh) than the anode bag, simply because one separator layer defense against the zinc is adequate, and, since the cathode sheet is permanently fixed in the cell and cannot easily be replaced, therefore a stronger, coarser, mesh is used on the cathode. Both the anode and cathode meshes should be as open and as thin as possible, consistent with strength, weight, and cost, to minimize ohmic drop in the cell and allow maximum free liquid between the plates for electrolyte circulation and elimination of clinging gas bubbles. Since inter-electrode separation in the cell is only about 1 mm initially, and will decrease during discharge, separator thicknesses of, if possible, below 100 microns per layer, and a free surface at least in the 20-40% range, are preferred. Thus, preferred separators will have the following parameters:

|  | Thickness (Microns) | Mesh per Inch | Open Area (%) |
| --- | --- | --- | --- |
| Anode Separator | 40-130 [70] | 200-500 [400] | 15-40 [20] |
| Cathode Separator | 50-150 [105] | 100-300 [150] | 20-50 [40] |

Regarding comparison to details in our above-mentioned U.S. Pat. No. 5,196,275 (column 9, line 38, etc.), the woven mesh referred to therein was far coarser, having a 330 micron strand diameter and a mesh designation coarser than about 50 mesh, than that of the present invention, wherein strand diameters are about 35 microns for the anode bag and about 60 microns for the cathode sheet, and mesh designations are as indicated hereinabove.

A coarse mesh was adequate in U.S. Pat. No. 5,196,275, due to reliance on additional, non-woven, felt-type or selective film separators. We have found, however, that such additional "closed type" separators are less than desirable, since the non-woven felts tend to trap zinc particles and cannot be easily cleaned in the subsequent regeneration stages; the selective films are of high resistance and are easily torn. Accordingly, a working solution has been found in the sole use of woven, albeit finer, mesh separators, as described hereinabove.

A potential problem with the above-described system is that, upon removing the anode with its separator bag from the cell, a partial vacuum is hydraulically induced in the cell base regions, since the anode, having formed substantial quantities of zinc oxide during discharge, has expanded somewhat, thereby restricting fluid redistribution in the cell, and electrolyte at the top and sides of the cell cannot reach the base areas so quickly. This vacuum causes the air electrodes to be sucked inwards to flex in and out, and the base area of the electrode where it connects to the cell frame, where maximum hydraulic stresses are normally experienced, can crack or leak after a relatively small number of anode replacement cycles.

In especially preferred embodiments of the present invention, the above problem is solved by providing at least one fluid transfer conduit adjacent an inner face of at least one of said minor surfaces of said housing, said conduit having an inlet in fluid communication with electrolyte in an upper volume of said housing interior space, and an outlet in fluid communication with a volume of said housing interior adjacent said housing base.

In a first preferred embodiment, said fluid transfer conduit is a tube mounted adjacent said housing inner face, having a preferred inner diameter of about 4 to 5 mm. In a second preferred embodiment, said fluid transfer conduit is formed by a space left between an inner face of said minor surface of said housing and a minor surface of said replaceable metal electrode, said space having a width of at least about 2 mm.

Alternatively, the above-mentioned problem is solved by providing at least one fluid transfer conduit in said anode, said conduit having an inlet in fluid communication with electrolyte in an upper volume of said housing interior space, and an outlet in fluid communication with a volume of said housing interior adjacent said housing base.

These fluid transfer conduits have been found to allow facile electrolyte redistribution to the base regions of the cell when the anode is withdrawn therefrom, while preventing electrolyte pressure resistance to the reinsertion of a charged anode.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a non-detailed, perspective view of a battery according to the present invention;

FIG. 2 is a perspective view of a single battery cell, showing the metal electrode partially withdrawn;

FIG. 3 is a sectional end view of the cell of FIG. 2;

Figure 4:
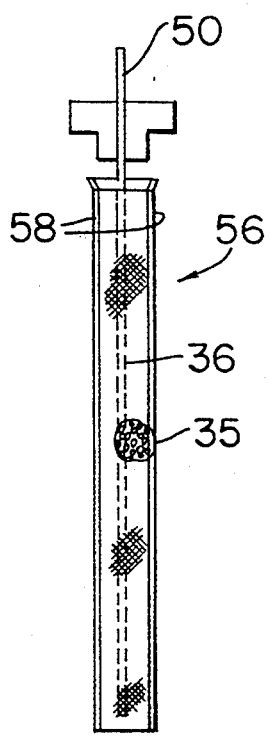
FIG. 4 is an end view of a preferred embodiment of a metal electrode wherein the plastic mesh envelopes the electrode.

There is shown in FIG. 1, in non-detailed form, a mechanically rechargeable, electrochemical metal-air battery 10. The battery 10 is of the type having a plurality of cells 12, details of which will be given below.

Each cell 12 has positive and negative electric contact terminals 14 and 16 respectively; these are seen in FIG. 2. Bus bars 18, shown in broken lines, provide cell interconnections. Air ports 20, 22 allow supply of the required air.

Referring now to FIGS. 2 and 3, a cell 12 is seen in further detail. The cell 12 has a non-conductive housing 24, suitably made of polypropylene. The housing 24 comprises a base 26, two major surfaces 28, and two minor surfaces 30 defining an interior space 32, part of which is occupied by a replaceable metal electrode 34, the anode, when the battery is in use. Housing 24 is conveniently made, as shown, of a pair of similar interfitting moldings 24a, 24b.

Preferably, the active component of the metal electrode 34 comprises a power storage slurry 35 containing active porous zinc particles saturated with an electrolyte solution and compacted under pressure to a skeletal member 36.

The remaining part of space 32 is filled by an alkaline electrolyte 38; water-based KOH has been found to be particularly suitable. The electrolyte 38 contacts both sides of the metal electrode 34.

Metal electrode 34 is configured to be easily removed, when exhausted, through an opening 40 in cell housing 24 opposite base 26, and to be replaced by a fresh electrode 34. The cell 12 is, however, fully sealed against electrolyte 38 leakage when the electrode 34 is fully seated. Electrical make and break means (not shown) are further provided between contact terminals 14, 16 and the bus bars 18.

The embodiment shown has two air-permeable, but liquid-impermeable, air electrodes 42, one in each window-like opening 44 provided in each housing major surface 28.

Construction of the electrode will now be described, with particular reference to the improvement of the present invention which provides first and second woven mesh separators 46, 48 for electrodes 42, 34 respectively.

As illustrated, two cathodic air electrodes 42 are of basically conventional design, comprising a conductive current collector (not shown) and a metallic mesh 52. The mesh 52 basically consists of a thin, perforated nickel screen, typically 0.2 mm thick, having a mesh sizing of 20 holes/inch. A hydrophobic blocking layer, suitably Teflonized carbon, is laminated to the outer face of the mesh, which thus remains permeable to air but becomes impermeable to electrolyte 38. The inner side of the mesh 52 is laminated with a composite having a high affinity for oxygen and a capacity for reducing this gas to hydroxyl ions. Composites selected from Teflon, silver, mixed metal oxides and macrocyclics, with or without carbon, have been found particularly suitable. Various known-in-the-art catalysts and composite constructions may be used, depending on factors such as cost limits and performance required.

A first woven mesh separator 46 is permanently attached to and covers the inner face of each air electrode 42. A suitable separator 46 has a mesh size of 100–300 mesh, a strand diameter of about 20–80 microns, and an open surface of about 20–50%. Suitable materials include a long-chain polymeric amide, nylon and polypropylene. Aside from its outstanding chemical resistance, polypropylene with a specific gravity of 0.906 is one of the lightest plastics known, this being of particular advantage in a battery intended for use in road vehicles. Nylon also has good chemical resistance, and shows advantages in low friction and good wear properties, which are of benefit during withdrawal and replacement of the metal electrode 34, when the mesh separators 46 and 48 slide and rub against each other. Other materials suitable for the job are based on PEEK, Tefzel, or Teflon and may include expanded meshes as well as woven ones. The mesh separators further inhibit migration of zinc particles from the anodic metal electrode 34 to the cathodic air electrode 42, thus preventing an effect which could lead to cell shorting.

The metal electrode 34 comprises a compacted power storage slurry 35, a skeletal member 35, negative terminal strip 50 and second woven mesh separators 48, covering at least both major surfaces of the compacted slurry 35.

The second woven mesh separator 48 is suitably made of a fine mesh in the 200–500 mesh range, having a strand diameter of about 20–70 microns, its open surface being 15–40%. The same materials may be used as for the first mesh separator 38, that is, a long-chain polymeric amide, nylon, or polypropylene, and for the same stated reasons. The mesh separators 46, 48 serve to protect the electrodes 34, 42 from damaging each other when the metal electrode 34 is withdrawn or replaced in the cell 12.

Referring now to FIG. 4, there is seen a further embodiment of a metal electrode 56, similar to the metal electrode 34. However, the second woven mesh separator used to cover and enclose both major surfaces of the electrode 56 forms a bag 58 therearound. The mesh and material of the bag 58 is the same as that used for the separator 48. The separator bag 58 can conveniently be formed by sealing a folded sheet of woven mesh at its sides. When electrode 56 is removed from cell 12, the bag 58 is simultaneously removed.

Figure 5:
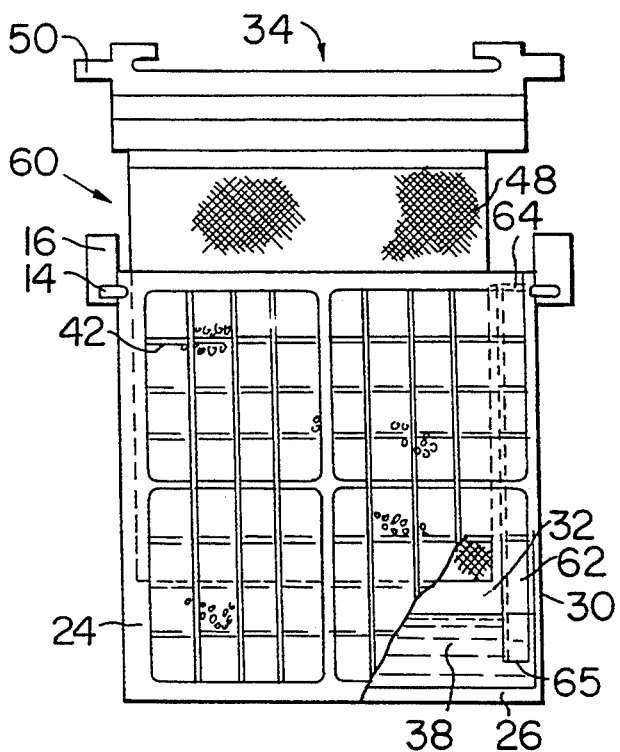
FIGS. 5, 6 and 7 are partially-fragmented, front elevational views of cells provided with means for breaking the partial vacuum formed in the cell when the metal electrode is withdrawn.

FIG. 5 depicts a cell embodiment 60 providing a first solution to the problem of vacuum formation on metal electrode 34 (anode) withdrawal, and to overcoming electrolyte hydraulic resistance to insertion of a new anode. The drawing shows a single fluid transfer conduit 62, advantageously in the form of a tube mounted adjacent to an inner face of a minor surface 30 of housing 24. Preferably, the tube inner diameter is at least 4 mm.

The conduit 62 does not move relative to the housing 24, and can suitably be attached thereto. Conduit 62 has an upper port 64 in fluid communication with an upper volume of interior space 32, and a lower port 66 in fluid communication with electrolyte 38 in a volume of the housing interior adjacent to the housing base 26.

It may be noted that upon electrode withdrawal, the upper port 64 allows air ingress, while upon electrode insertion port 66 releases air which would otherwise be constrained in the housing 20. In both modes, movement of the metal electrode 34 is eased and excessive stresses are avoided on both electrodes 34, 42.

Figure 6:
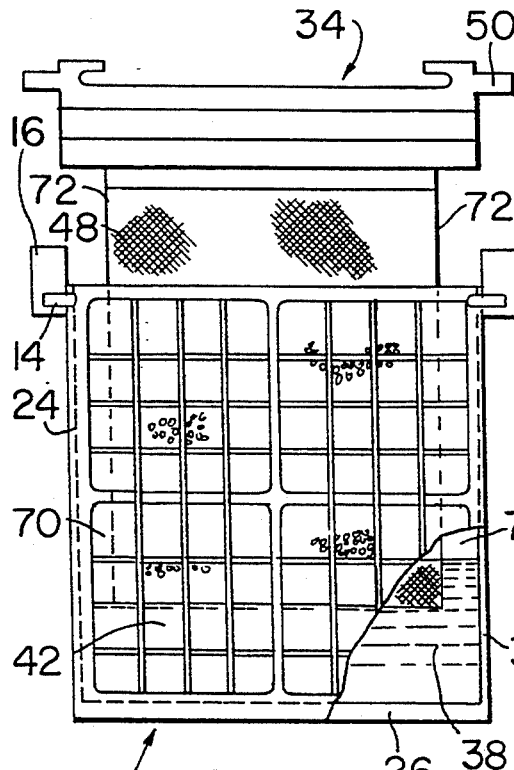

FIG. 6 shows a second embodiment of a cell 68 to serve the same purpose of easing insertion and withdrawal of electrodes. A fluid transfer conduit is formed by a space 70, or, as shown in this embodiment, two spaces 70 are left between minor surfaces 30 of the housing 24, and between minor surfaces 72 of the replaceable metal electrode 34. The spaces 70, which preferably have a width of at least 2 mm, allow downward flow of the electrolyte 38 on withdrawal of the metal electrode 34, and allow upward flow upon its replacement.

Figure 7:
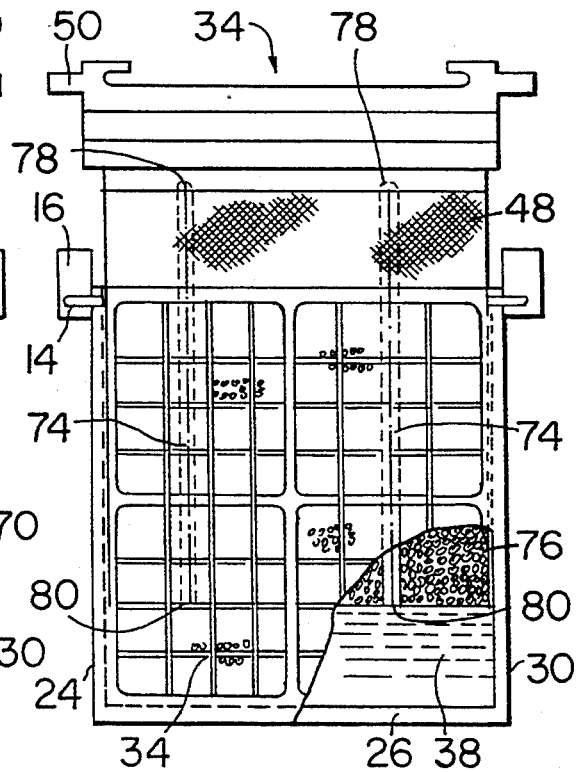

Seen in FIG. 7 is a third embodiment of a cell 72 provided with means to overcome partial vacuum formation upon electrode separation. Several fluid transfer conduits 74 are provided in the metallic anode electrode 76. Conduits 74 have upper ports 78 in fluid communication with an upper volume of interior space 32 (shown in FIG. 5), and lower ports 80 in fluid communication with electrolyte 38 in a volume of the housing interior adjacent to housing base 26. Upon electrode withdrawal, the upper ports 78 allow air ingress, while upon electrode insertion the ports 78 release air which would otherwise be constrained in the housing 24, thereby easing both withdrawal and insertion of the electrode, as explained hereinabove.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a mechanically rechargeable, electrochemical metal-air battery having a plurality of metal-air cells, each of said cells comprising:
   a) a housing having a base, two major surfaces and two minor surfaces, defining an interior space for containing therein a replaceable metal electrode having an electrically conductive skeletal member encompassed by an active metal component, said interior space communicating with an opening opposite said base through which said replaceable metal electrode is selectively removed to enable the mechanical replacement thereof with a freshly charged metal electrode;
   b) at least one generally planar, air permeable but liquid impermeable, air electrode, each of said air electrodes being installed in a window-like opening provided in at least one of said major surfaces; and
   c) an electrolyte in contact with the metal and air electrodes;
the improvement comprising a first woven mesh separator attached to an inner, electrolyte-facing surface of each of said at least one air electrodes and a second, woven mesh separator attached to and covering a major surface of said replaceable metal electrode facing each of said at least one air electrodes, said first and second woven mesh separators being in sliding relationship to each other.

2. A mechanically rechargeable, electrochemical metal-air battery according to claim 1, having a plurality of metal-air cells; each of said cells comprising a pair of outer air electrodes, defining therebetween said interior space, wherein an inner, electrolyte-facing surface of each of said air electrodes is respectively covered with a permanently-attached, first, woven mesh separator and said replaceable metal electrode is covered on both of its major surfaces with a second, woven mesh separator, said first and second woven mesh separators being in sliding relationship to each other.

3. A mechanically rechargeable, electrochemical metal-air battery according to claim 2, wherein a single sheet of woven mesh material is used to cover and enclose both major surfaces of said metal electrode, forming a bag therearound.

4. A mechanically rechargeable, electrochemical metal-air battery according to claim 1, wherein said cell is a zinc-air battery cell and said active metal component comprises a power storage slurry containing active porous zinc particles saturated with an electrolyte solution and compacted under pressure to said skeletal member.

5. A mechanically rechargeable, electrochemical metal-air battery according to claim 1, wherein said second, woven mesh separator is characterized by a fine mesh in the range of about 200–500 mesh and an open surface of about 15–40%, and said first, woven mesh separator is characterized by a coarser mesh in the range of about 100–300 mesh and an open surface of about 20–50%.

6. A mechanically rechargeable, electrochemical metal-air battery according to claim 1, wherein both said first and said second woven mesh separators are made of a polymeric material including a long chain synthetic polymeric amide and polypropylene, and woven or expanded mesh.

7. A mechanically rechargeable, electrochemical metal-air battery according to claim 1, further comprising at least one fluid transfer conduit provided adjacent to an inner face of at least one of said minor surfaces of said housing, said conduit having an upper port in fluid communication with electrolyte in an upper volume of said housing interior space, and a lower port in fluid communication with a volume of said housing interior adjacent said housing base.

8. A mechanically rechargeable, electrochemical metal-air battery according to claim 7, wherein said fluid transfer conduit is a tube mounted adjacent said housing inner face.

9. A mechanically rechargeable, electrochemical metal-air battery according to claim 8, wherein said tube has an inner diameter of at least 4 mm.

10. A mechanically rechargeable, electrochemical metal-air battery according to claim 7, wherein said fluid transfer conduit is formed by a space left between an inner face of said minor surface of said housing and a minor surface of said replaceable metal electrode.

11. A mechanically rechargeable, electrochemical metal-air battery according to claim 10, wherein said space has a width of at least 2 mm.

12. A mechanically rechargeable, electrochemical metal-air battery according to claim 1, further comprising at least one fluid transfer conduit provided in said anode, said conduit having an inlet in fluid communication with electrolyte in an upper volume of said housing interior space, and an outlet in fluid communication with a volume of said housing interior adjacent to said housing base.

* * * * *